US011526621B2

United States Patent

(12) United States Patent
Behera et al.

(10) Patent No.: US 11,526,621 B2
(45) Date of Patent: Dec. 13, 2022

(54) METHOD AND SYSTEM FOR CAPTURING ASSET PROTECTION METADATA PERTINENT TO ANALYTICS

(71) Applicant: EMC IP Holding Company LLC, Hopkinton, MA (US)

(72) Inventors: Amarendra Behera, Bangalore (IN); Tushar B. Dethe, Bangalore (IN); Gururaj Soma, Bangalore (IN); Shelesh Chopra, Bangalore (IN); Krishnendu Bagchi, Bangalore (IN); Himanshu Arora, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 546 days.

(21) Appl. No.: 16/673,468

(22) Filed: Nov. 4, 2019

(65) Prior Publication Data

US 2021/0133339 A1 May 6, 2021

(51) Int. Cl.

*G06F 21/62* (2013.01)
*G06F 12/06* (2006.01)
*G06F 16/11* (2019.01)
*G06F 11/07* (2006.01)

(52) U.S. Cl.

CPC ...... *G06F 21/6218* (2013.01); *G06F 11/0709* (2013.01); *G06F 11/0751* (2013.01); *G06F 11/0787* (2013.01); *G06F 12/06* (2013.01); *G06F 16/122* (2019.01); *G06F 2212/152* (2013.01)

(58) Field of Classification Search

None

See application file for complete search history.

(56) References Cited

U.S. PATENT DOCUMENTS 7,415,585 B1 * 8/2008 Rossi .................. G06F 11/1458 711/161
7,529,898 B2 * 5/2009 Nguyen .............. G06F 11/1458 707/999.1
7,634,511 B1 * 12/2009 Freiheit .............. G06F 11/1458 707/999.102
8,484,737 B1 * 7/2013 Swift .................. G06F 21/6245 709/224
2011/0113012 A1 * 5/2011 Gruhl .................. G06F 11/1451 707/646

* cited by examiner

*Primary Examiner* — Elias Mamo

(74) *Attorney, Agent, or Firm* — Chamberlain, Hrdlicka, White, Williams & Aughtry

(57) ABSTRACT

A method and system for capturing asset protection metadata pertinent to analytics. Specifically, the disclosed method and system entail aggregating and maintaining asset protection metadata—i.e., metadata descriptive of performed asset backup and recovery operations—in a central location. The asset protection metadata may include information relevant to backup and recovery analytics and reporting, while the maintaining said metadata in the central location facilitates access of the metadata by third-party analytics services.

18 Claims, 4 Drawing Sheets

METHOD AND SYSTEM FOR CAPTURING ASSET PROTECTION METADATA PERTINENT TO ANALYTICS

BACKGROUND

Concerning data analytics, analysis and reporting tools tend to query for information from established data sources. These data sources, however, may not maintain all information sought by the query.

SUMMARY

In general, in one aspect, the invention relates to a method for capturing asset protection data. The method includes receiving a user asset protection request comprising a first asset protection metadata partition, establishing, to a service, a service access connection using at least a portion of the first asset protection metadata partition, performing, in response to the user asset protection request, a protection action to obtain a second asset protection metadata partition, appending, using the service access connection, the first asset protection metadata partition and the second asset protection metadata partition to an error message log, and terminating the service access connection.

In general, in one aspect, the invention relates to a non-transitory computer readable medium (CRM) that includes computer readable program code, which when executed by a computer processor, enables the computer processor to: receive a user asset protection request comprising a first asset protection metadata partition, establish, to a service, a service access connection using at least a portion of the first asset protection metadata partition, perform, in response to the user asset protection request, a protection action to obtain a second asset protection metadata partition, append, using the service access connection, the first asset protection metadata partition and the second asset protection metadata partition to an error message log, and terminate the service access connection.

In general, in one aspect, the invention relates to a client device that includes a client storage array storing an error message log, a computer processor operatively connected to the client storage array, and a service and an agent executing on the computer processor, wherein the agent is programmed to: receive a user asset protection request comprising a first asset protection metadata partition, establish, to the service, a service access connection using at least a portion of the first asset protection metadata partition, perform, in response to the user asset protection request, a protection action to obtain a second asset protection metadata partition, append, using the service access connection, the first asset protection metadata partition and the second asset protection metadata partition to the error message log, and terminate the service access connection.

Other aspects of the invention will be apparent from the following description and the appended claims.

DETAILED DESCRIPTION

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1A-3, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and a first element may encompass more than one element and succeed (or precede) the second element in an ordering of elements.

In general, embodiments of the invention relate to a method and system for capturing asset protection metadata pertinent to analytics. Specifically, one or more embodiments of the invention entails aggregating and maintaining asset protection metadata—i.e., metadata descriptive of performed asset backup and recovery operations—in a central location. The asset protection metadata may include information relevant to backup and recovery analytics and reporting, while the maintaining said metadata in the central location facilitates access of the metadata by third-party analytics services.

Figure 1A:
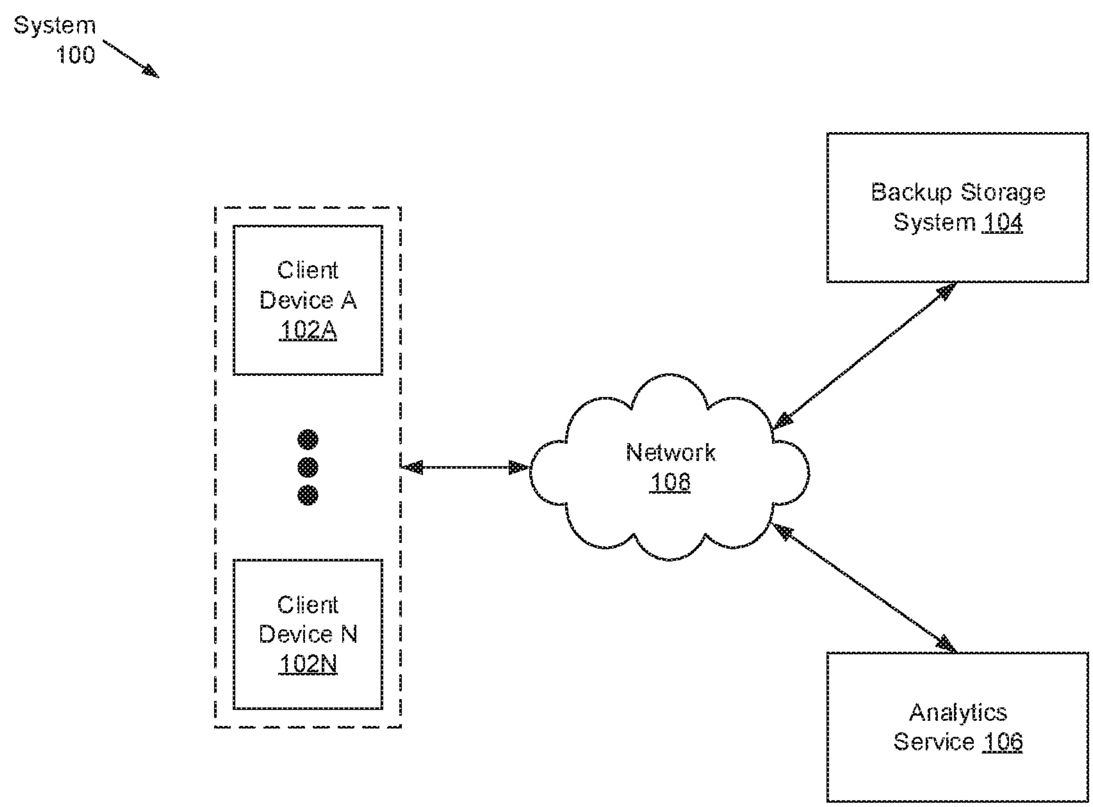
FIG. 1A shows a system in accordance with one or more embodiments of the invention.

FIG. 1A shows a system in accordance with one or more embodiments of the invention. The system (100) may include one or more client devices (102A-102N), a backup storage system (104), and an analytics service (106). Each of these system (100) components is described below.

In one embodiment of the invention, the above-mentioned system (100) components may operatively connect to one another through a network (108) (e.g., a local area network (LAN), a wide area network (WAN) such as the Internet, a mobile network, any other network type, or a combination thereof). The network (108) may be implemented using any combination of wired and/or wireless connections. Further, the network (108) may encompass various interconnected, network-enabled components (e.g., switches, routers, gateways, etc.) that may facilitate communications between the above-mentioned system (100) components. Moreover, the above-mentioned system (100) components may communicate with one another using any combination of wired and/or wireless communication protocols.

In one embodiment of the invention, a client device (102A-102N) may represent any physical computing system designed and configured to receive, generate, process, store, and/or transmit data, as well as to provide an environment in which one or more computer programs (not shown) may execute thereon. The computer program(s) may, for example, implement large-scale and complex data processing; or implement one or more services offered locally or over the network. Further, in providing an execution environment for the computer program(s) installed thereon, a client device (102A-102N) may include and allocate various resources (e.g., computer processors, memory, storage, virtualization, network bandwidth, etc.), as needed, to the computer program(s) and the task(s) (process(es)) instantiated thereby. One of ordinary skill will appreciate that a client device (102A-102N) may perform other functionalities without departing from the scope of the invention. Examples of a client device (102A-102N) may include, but are not limited to, a desktop computer, a laptop computer, a workstation computer, a server, a mainframe, or any other computing system similar to the exemplary computing system shown in FIG. 3. Moreover, any client device (102A-102N) is described in further detail below with respect to FIG. 1B.

In one embodiment of the invention, the backup storage system (104) may represent a data backup, archiving, and/or disaster recovery storage system. To that extent, the backup storage system (104) may at least be designed and configured to: receive and store system and user asset copies, respective to one or more services (described below) (see e.g., FIG. 1B), from the client device(s) (102A-102N) during asset backup operations; and retrieve and restore system and user asset copies, respective to the aforementioned service(s), onto the client device(s) (102A-102N) during asset recovery operations. One of ordinary skill will appreciate that the backup storage system (104) may perform other functionalities without departing from the scope of the invention.

In one embodiment of the invention, the backup storage system (104) may be implemented using one or more servers (not shown). Each server may reflect a physical server, which may reside in a datacenter, or a virtual server, which may reside in a cloud computing environment. Additionally or alternatively, the backup storage system (104) may be implemented using one or more computing systems similar to the exemplary computing system shown in FIG. 3.

In one embodiment of the invention, each above-mentioned server (or computing system) may include a collection of one or more physical storage devices (not shown) on which various forms of data—e.g., the above-mentioned system and user asset copies respective to one or more services executing on one or more client devices (102A-102N)—may be consolidated. Each physical storage device may encompass non-transitory computer readable storage media on which data may be stored in whole or in part, and temporarily or permanently. Further, each physical storage device may be designed and configured based on a common or different storage device technology—examples of which may include, but are not limited to, flash based storage devices, fibre-channel (FC) based storage devices, serial-attached small computer system interface (SCSI) (SAS) based storage devices, and serial advanced technology attachment (SATA) storage devices. Moreover, any subset of the physical storage device(s) on each server (or computing system) may be implemented using persistent (i.e., non-volatile) storage. Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one embodiment of the invention, the analytics service (106) may represent a third-party platform directed to backup and recovery metadata analytics and reporting. To that extent, the analytics service (106) may at least be designed and configured to: access and obtain asset protection metadata, respective to backup and recovery operations involving one or more services (described below) (see e.g., FIG. 1B), from the client device(s) (102A-102N); and derive and publish analytics information based on the aforementioned asset protection metadata. One of ordinary skill will appreciate that the analytics service (106) may perform other functionalities without departing from the scope of the invention.

In one embodiment of the invention, the analytics service (106) may be implemented using one or more servers (not shown). Each server may reflect a physical server, which may reside in a datacenter, or a virtual server, which may reside in a cloud computing environment. Additionally or alternatively, the analytics service (106) may be implemented using one or more computing systems similar to the exemplary computing system shown in FIG. 3.

While FIG. 1A shows a configuration of components, other system (100) configurations may be used without departing from the scope of the invention. For example, the system (100) may further include one or more additional backup storage systems (not shown) and/or one or more additional analytics services (not shown).

Figure 1B:
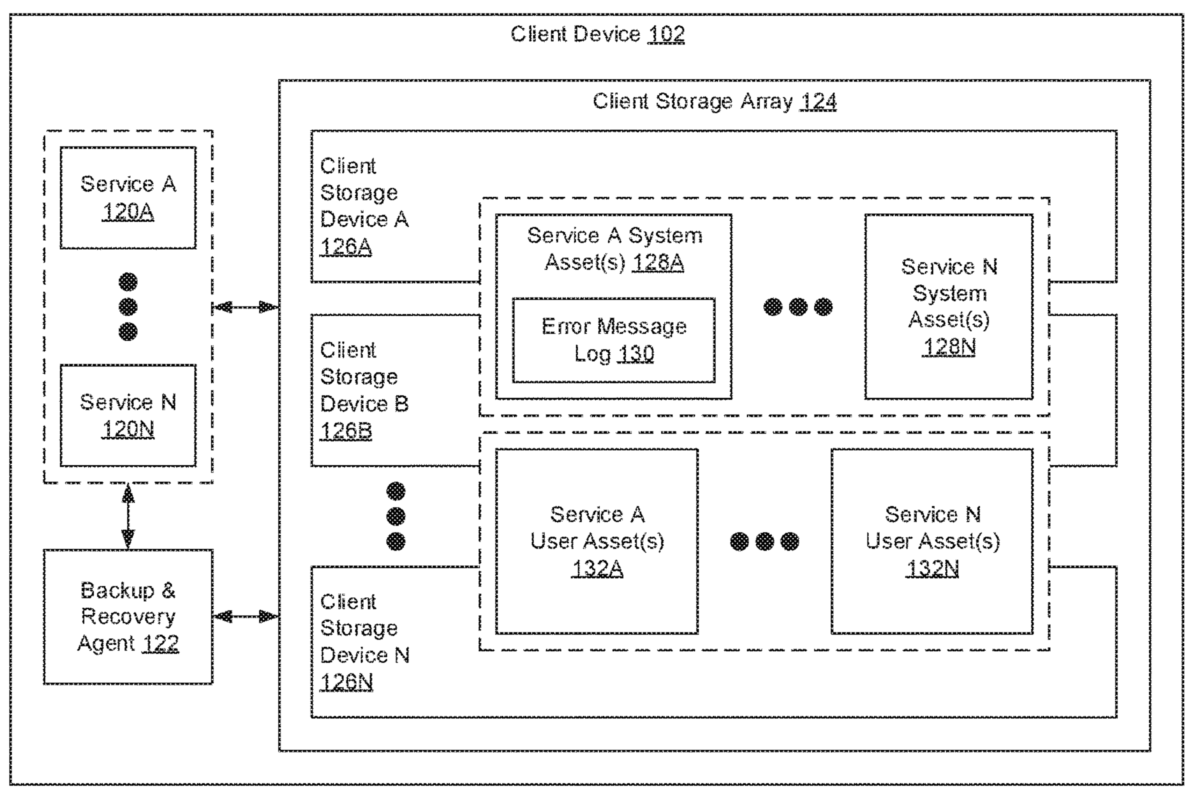
FIG. 1B shows a client device in accordance with one or more embodiments of the invention.

FIG. 1B shows a client device in accordance with one or more embodiments of the invention. The client device (102) may include one or more services (120A-120N), a backup and recovery agent (122), and a client storage array (124). Each of these client device (102) subcomponents is described below.

In one embodiment of the invention, a service (120A-120N) may represent a database management system instance (e.g., a computer program), which may execute on the underlying hardware of the client device (102) as an operating system service. Each service (120A-120N) may manage one or more databases (also referred to as assets), which may maintain both system-pertinent and user-defined information and metadata. Further, any given service (120A-120N) may include functionality to enable client device (102) users to store and query data across the asset(s) respective to the given service (120A-120N). One of ordinary skill will appreciate that a service (120A-120N) may perform other functionalities without departing from the scope of the invention.

In one embodiment of the invention, the backup and recovery agent (122) may refer to a computer program that may execute on the underlying hardware of the client device (102). Specifically, the backup and recovery agent (122) may be responsible for facilitating asset backup and recovery operations (also referred to herein as protection actions). To that extent, the backup and recovery agent (122) may include functionality to perform the various steps outlined below with respect to FIG. 2, which may be directed to capturing asset protection metadata pertinent to analytics. One of ordinary skill will appreciate that the backup and recovery agent (122) may perform other functionalities without departing from the scope of the invention.

In one embodiment of the invention, the client storage array (124) may refer to physical data storage across which various forms of data—e.g., one or more service system assets (128A-128N) and one or more service user assets (132A-132N) (both described below) for each service (120A-120N)—may be maintained. The client storage array (124) may be implemented using one or more client storage devices (126A-126N). Each client storage device (126A-126N) may encompass non-transitory computer readable storage media on which data may be stored in whole or in part, and temporarily or permanently. Further, each client storage device (126A-126N) may be designed and configured based on a common or different storage device technology—examples of which may include, but are not limited to, flash based storage devices, fibre-channel (FC) based storage devices, serial-attached small computer system interface (SCSI) (SAS) based storage devices, and serial advanced technology attachment (SATA) storage devices. Moreover, any subset or all of the client storage array (124) may be implemented using persistent (i.e., non-volatile) storage. Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one embodiment of the invention, an asset—e.g., a service system asset (128A-128N) or a service user asset (132A-132N)—may generally represent a database, or a logical container to and from which related data may be stored and retrieved, respectively. Further, an asset may occupy a portion of a client storage device (126A-126N) or, alternatively, may span across multiple client storage devices (126A-126N), of the client storage array (124). More specifically, however, a service system asset (128A-128N), for a given service (120A-120N), may refer to a database that may maintain at least a portion of the system-level information pertinent to the maintenance and management of the given service (120A-120N). Meanwhile, a service user asset (132A-132AN), for a given service (120A-120N), may refer to a database that may maintain at least a portion of the user-defined information, such as content (e.g., tables, images, video, audio, etc.) and associated metadata, which one or more users of the given service (120A-120N) may seek to manage.

In one embodiment of the invention, amongst the above-mentioned system-level information respective to a given service (120A-120N), the service system asset(s) (128A-128N), for the given service (120A-120N), may maintain an error message log (130). The error message log (130) may represent a data object (e.g., a data file or a data structure) wherein messages detailing a history of events, having transpired on or to the given service (120A-120N), may be recorded. These events may include, but are not limited to, system errors, backup operations, recovery operations, data integrity checks, user logins, batch commands, and a host of other events. Further, due to the nature of these events, the messages recorded in the error message log (130) may be considered critical for issue analysis and/or troubleshooting purposes. Accordingly, of the numerous logs that may be maintained for any given service (120A-120N), the error message log (130) may represent the most acknowledged and accessible source of service-pertinent event information available to users, administrators, and/or third-parties alike. In view of the aforementioned, embodiments of the invention may use the error message log(s) (130), respective to the service(s) (120A-120N) executing on the client device (102), to export, and make readily accessible, asset protection metadata (described below), which may be pertinent to analytics, to the users, administrators, and/or third-parties.

While FIG. 1B shows a configuration of components, other client device (102) configurations may be used without departing from the scope of the invention.

Figure 2:
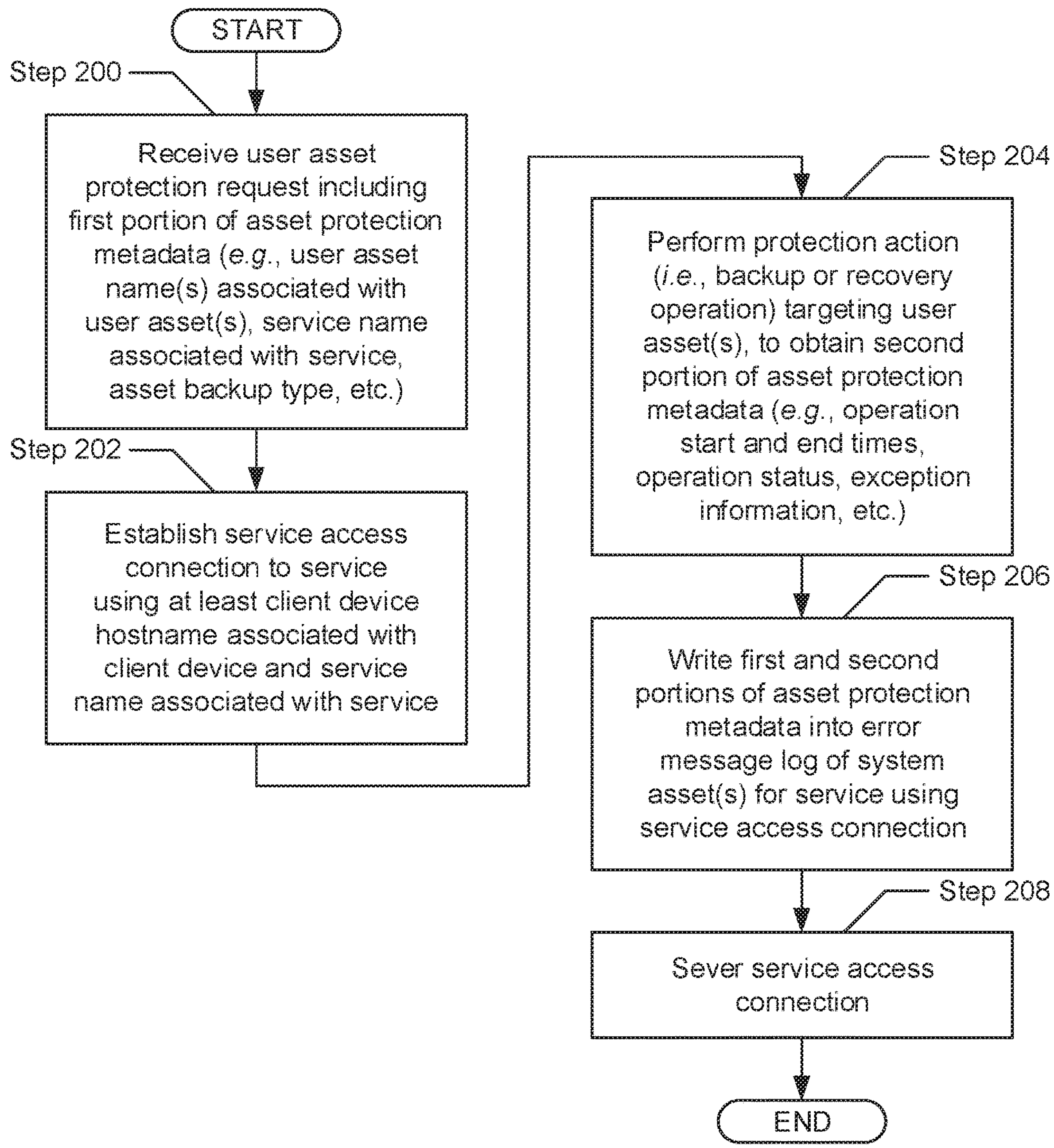
FIG. 2 shows a flowchart describing a method for capturing asset protection metadata pertinent to analytics in accordance with one or more embodiments of the invention.

FIG. 2 shows a flowchart describing a method for capturing asset protection metadata pertinent to analytics in accordance with one or more embodiments of the invention. The various steps outlined below may be performed by the backup and recovery agent on a client device (see e.g., FIG. 1B). Further, while the various steps in the flowchart are presented and described sequentially, one of ordinary skill will appreciate that some or all steps may be executed in different orders, may be combined or omitted, and some or all steps may be executed in parallel.

Turning to FIG. 2, in Step 200, a user asset protection request is received. In one embodiment of the invention, the user asset protection request may pertain to executing a protection action targeting one or more service user assets (or databases) belonging to a given service on the client device (see e.g., FIG. 1B). The protection action may encompass a backup operation or, alternatively, a recovery operation. Further, the user asset protection request may include information pertinent to executing the protection action (hereinafter collectively referred to as a first portion of asset protection metadata).

Integrally, in one embodiment of the invention, asset protection metadata may refer to information descriptive of a protection action, which may target one or more service user assets of a service. In order to wholly describe any given protection action, asset protection metadata may integrate two partitions (or portions) of information, each detailing a different aspect of the given protection action.

In one embodiment of the invention, the first partition (or portion) of asset protection metadata (which had been received in Step 200), respective to a given protection action, may be directed to configuration and/or command information, which may be a ascertained prior to execution of, and may be a requirement for executing, the protection action. Examples of the aforementioned configuration and/or command information may include, but are not limited to, a service name assigned to uniquely identify a target service of the protection action; one or more user asset names assigned to uniquely identify one or more target service user assets, respectively, of the protection action; a protection action type (if applicable) (e.g., for backup operations: a full backup operation, an incremental backup operation, a differential backup operation, etc.); a backup device hostname associated with, and backup device credentials for accessing, a target backup device to or from which service user asset copies may be directed or retrieved, respectively; an asset source (e.g., a database, one or more virtual devices, an application, etc.); and an asset storage type (e.g., a local disk, on a storage array, a network-attached storage (NAS) filer, etc.).

In one embodiment of the invention, the second partition (or portion) of asset protection metadata (which may be obtained below in Step 204), respective to a given protection action, may be directed to operational and/or resultant information, which may be ascertained during or following the execution of the protection action. Examples of the aforementioned operational and/or resultant information may include, but are not limited to, an operation start timestamp encoding a date and/or time marking an initiation of the protection action; an operation end timestamp encoding a date and/or time marking a termination of the protection action; a status label denoting a current status (e.g., in-progress, completed, failed, etc.) of the protection action; if applicable, information citing reason(s) for a failed protection action or for any warnings and/or errors documented during execution of the protection action; a total elapsed timestamp encoding a period of time in which the operation (s) have elapsed, an average elapsed timestamp encoding an average elapsed time period for one or more previous operations, a success rate label denoting a success rate of one or more previous operations, and a resource usage denoting computing resource use (e.g., memory, processing, etc.) of one or more operations.

In Step 202, a service access connection is established to a given service on the client device. In one embodiment of the invention, the service access connection may represent an inter-process communication link between the backup and recovery agent and the given service, residing on the client device. The service access connection may enable the backup and recovery agent (or any other initiator) to access the given service and, accordingly, its respective service system and service user assets. Furthermore, establishment of the service access connection may require a collection of parameters (e.g., a client device hostname associated with the client device, a service name associated with the given service, authorization credentials for accessing the client device and/or given service, etc.), which may be manipulated into a connection string—i.e., a character string specifying information pertaining to a data source (e.g., the given service) and means with which a connection to the data source may be established. Subsequently, the connection string may be passed to an underlying data provider, whom initiates the service access connection based on the information specified in the connection string. By way of an example, establishment of the service access connection may be achieved using ActiveX Data Objects (ADO) based middleware.

In Step 204, the protection action, to which the user asset protection request (received in Step 200) pertained, is performed. Specifically, in one embodiment of the invention, a backup operation, targeting the specified service user asset(s) of the given service, may be executed. In another embodiment of the invention, a recovery operation, targeting the specified service user asset(s) of the given service, may be executed. Regardless of the protection action performed, during or following the execution of the protection action, information descriptive of the protection action execution and/or resultant (collectively also referred to as the second portion of asset protection metadata) (described above) may be obtained.

In Step 206, the first portion (received in Step 200) and the second portion (obtained in Step 204) of asset protection metadata are appended to the error message log (described above) (see e.g., FIG. 1B) for the given service. In one embodiment of the invention, access and updating of the error message log may be facilitated through the service access connection to the given service (established in Step 202). Further, the asset protection metadata may be presented, in the error message log, as a collection of messages, which may be easily discernable and retrievable by any users, administrators, and/or third-parties seeking the asset protection metadata for analytic purposes.

Hereafter, in Step 208, the service access connection (established in Step 202) is severed or terminated. In one embodiment of the invention, termination of the service access connection may require a collection of parameters (e.g., a client device hostname associated with the client device, a service name associated with the given service, authorization credentials for accessing the client device and/or given service, etc.), which may be manipulated into a termination string—i.e., a character string specifying information pertaining to a data source (e.g., the given service) and means with which a connection to the data source may be terminated. Subsequently, the termination string may be passed to an underlying data provider, whom terminates the service access connection based on the information specified in the termination string. By way of an example, termination of the service access connection may be achieved using ActiveX Data Objects (ADO) based middleware.

Figure 3:
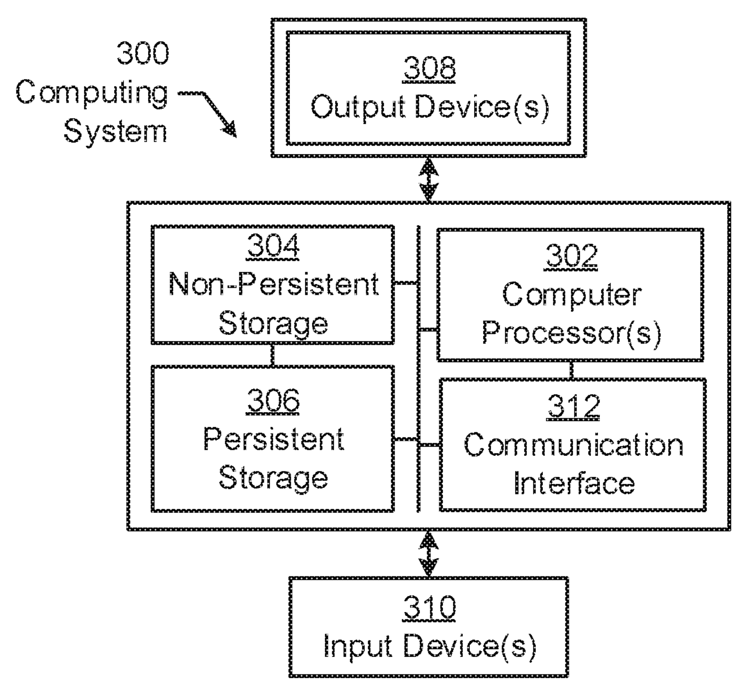
FIG. 3 shows an exemplary computing system in accordance with one or more embodiments of the invention.

FIG. 3 shows an exemplary computing system in accordance with one or more embodiments of the invention. The computing system (300) may include one or more computer processors (302), non-persistent storage (304) (e.g., volatile memory, such as random access memory (RAM), cache memory), persistent storage (306) (e.g., a hard disk, an optical drive such as a compact disk (CD) drive or digital versatile disk (DVD) drive, a flash memory, etc.), a communication interface (312) (e.g., Bluetooth interface, infrared interface, network interface, optical interface, etc.), input devices (310), output devices (308), and numerous other elements (not shown) and functionalities. Each of these components is described below.

In one embodiment of the invention, the computer processor(s) (302) may be an integrated circuit for processing instructions. For example, the computer processor(s) may be one or more cores or micro-cores of a central processing unit (CPU) and/or a graphics processing unit (GPU). The computing system (300) may also include one or more input devices (310), such as a touchscreen, keyboard, mouse, microphone, touchpad, electronic pen, or any other type of input device. Further, the communication interface (312) may include an integrated circuit for connecting the computing system (300) to a network (not shown) (e.g., a local area network (LAN), a wide area network (WAN) such as the Internet, mobile network, or any other type of network) and/or to another device, such as another computing device.

In one embodiment of the invention, the computing system (300) may include one or more output devices (308), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (302), non-persistent storage (304), and persistent storage (306). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for capturing asset protection metadata, comprising:

receiving a user asset protection request comprising a first asset protection metadata partition;

establishing, to a service, a service access connection using at least a portion of the first asset protection metadata partition;

performing, in response to the user asset protection request, a protection action to obtain a second asset protection metadata partition, wherein the second asset protection metadata partition comprises information describing the protection action during and following performance of the protection action, wherein the information comprises a status label denoting a current status of the protection action and a success rate label denoting a success rate of a plurality of previous protection actions;

appending, using the service access connection, the first asset protection metadata partition and the second asset protection metadata partition to an error message log; and terminating the service access connection.

2. The method of claim 1, wherein the first asset protection metadata partition comprises information describing the protection action prior to performance of the protection action.

3. The method of claim 1, wherein the service is a database management system instance.

4. The method of claim 1, wherein the service access connection is established using ActiveX Data Objects (ADO) middleware.

5. The method of claim 1, wherein the protection action is one selected from a group consisting of a backup operation and a recovery operation.

6. The method of claim 1, wherein the protection action targets at least one service user asset belonging to the service.

7. The method of claim 1, wherein the error message log records event messages detailing events transpiring on and to the service.

8. The method of claim 1, wherein the error message log is maintained across at least one service system asset belonging to the service.

9. A non-transitory computer readable medium (CRM) comprising computer readable program code, which when executed by a computer processor, enables the computer processor to:

receive a user asset protection request comprising a first asset protection metadata partition;

establish, to a service, a service access connection using at least a portion of the first asset protection metadata partition;

perform, in response to the user asset protection request, a protection action to obtain a second asset protection metadata partition, wherein the second asset protection metadata partition comprises information describing the protection action during and following performance of the protection action, wherein the information comprises a status label denoting a current status of the protection action and a success rate label denoting a success rate of a plurality of previous protection actions;

append, using the service access connection, the first asset protection metadata partition and the second asset protection metadata partition to an error message log; and terminate the service access connection.

10. The non-transitory CRM of claim 9, wherein the first asset protection metadata partition comprises information describing the protection action prior to performance of the protection action.

11. The non-transitory CRM of claim 9, wherein the service is a database management system instance.

12. The non-transitory CRM of claim 9, wherein the service access connection is established using ActiveX Data Objects (ADO) middleware.

13. The non-transitory CRM of claim 9, wherein the protection action is one selected from a group consisting of a backup operation and a recovery operation.

14. The non-transitory CRM of claim 9, wherein the protection action targets at least one service user asset belonging to the service.

15. The non-transitory CRM of claim 9, wherein the error message log records event messages detailing events transpiring on and to the service.

16. The non-transitory CRM of claim 9, wherein the error message log is maintained across at least one service system asset belonging to the service.

17. A client device, comprising:

a client storage array storing an error message log;

a computer processor operatively connected to the client storage array; and a service and an agent executing on the computer processor, wherein the agent is programmed to:

receive a user asset protection request comprising a first asset protection metadata partition;

establish, to the service, a service access connection using at least a portion of the first asset protection metadata partition;

perform, in response to the user asset protection request, a protection action to obtain a second asset protection metadata partition, wherein the second asset protection metadata partition comprises information describing the protection action during and following performance of the protection action, wherein the information comprises a status label denoting a current status of the protection action and a success rate label denoting a success rate of a plurality of previous protection actions;

append, using the service access connection, the first asset protection metadata partition and the second asset protection metadata partition to the error message log; and terminate the service access connection.

18. The client device of claim 17, further comprising:

an analytics service operatively connected to the client device, wherein the analytics service is programmed to:

access the error message log;

extract, from the error message log, asset protection metadata comprising the first asset protection metadata partition and the second asset protection metadata partition; and generate analytics information based on the asset protection metadata.

* * * * *